(12) United States Patent
Cho et al.

(10) Patent No.: US 8,050,351 B2
(45) Date of Patent: Nov. 1, 2011

(54) QUADRATURE MODULATOR WITH FEEDBACK CONTROL AND OPTICAL COMMUNICATIONS SYSTEM USING THE SAME

(75) Inventors: Pak Shing Cho, Gaithersburg, MD (US); Jacob Khurgin, Baltimore, MD (US); Isaac Shpantzer, Bethesda, MD (US)

(73) Assignee: CeLight, Inc., Silver Spring, MD (US)

( * ) Notice: Subject to any disclaimer, the term of this patent is extended or adjusted under 35 U.S.C. 154(b) by 1138 days.

(21) Appl. No.: 11/679,376

(22) Filed: Feb. 27, 2007

(65) Prior Publication Data
US 2007/0133918 A1    Jun. 14, 2007

Related U.S. Application Data

(63) Continuation-in-part of application No. 10/669,130, filed on Sep. 22, 2003, now Pat. No. 7,327,913, which is a continuation-in-part of application No. 10/613,772, filed on Jul. 2, 2003, now Pat. No. 7,272,271, which is a continuation-in-part of application No. 10/672,372, filed on Feb. 26, 2003, now Pat. No. 7,186,772.

(60) Provisional application No. 60/777,610, filed on Feb. 28, 2006.

(51) Int. Cl.
*H04L 27/00* (2006.01)

(52) U.S. Cl. ........ 375/295; 375/279; 375/280; 375/308; 332/103; 332/104; 332/105; 398/188; 359/279

(58) Field of Classification Search .......... 375/279–280, 375/295, 308; 332/103–105; 398/188; 359/279
See application file for complete search history.

(56) References Cited

U.S. PATENT DOCUMENTS

| | | | | |
|---|---|---|---|---|
| 5,323,406 A | * | 6/1994 | Yee et al. | 372/26 |
| 6,404,535 B1 | * | 6/2002 | Leight | 359/306 |
| 6,650,458 B1 | * | 11/2003 | Prosyk et al. | 359/276 |
| 2002/0097874 A1 | * | 7/2002 | Foden et al. | 380/256 |
| 2003/0076570 A1 | * | 4/2003 | Schemmann et al. | 359/189 |
| 2003/0098408 A1 | * | 5/2003 | Yasuoka et al. | 250/214.1 |
| 2003/0175037 A1 | * | 9/2003 | Kimmitt et al. | 398/198 |
| 2004/0008395 A1 | * | 1/2004 | McBrien et al. | 359/238 |
| 2004/0081470 A1 | * | 4/2004 | Griffin | 398/188 |
| 2005/0117191 A1 | * | 6/2005 | Griffin | 359/245 |
| 2005/0196176 A1 | * | 9/2005 | Sun et al. | 398/152 |

* cited by examiner

*Primary Examiner* — Curtis B Odom
(74) *Attorney, Agent, or Firm* — Nadya Reingand

(57) ABSTRACT

The method and system are disclosed for automatic feedback control of integrated optical quadrature modulator for generation of optical quaternary phase-shift-keyed signal in coherent optical communications. The method comprises the steps of detecting at least a part of an output optical signal from the QPSK modulator, extracting of a particular portion of the output signal in frequency domain, and processing the signal in frequency domain to optimize the transmission of an optical link. The system and method of optical communications in fiber or free space are disclosed that implement the quadrature data modulator with automatic feedback control.

10 Claims, 10 Drawing Sheets

QUADRATURE MODULATOR WITH FEEDBACK CONTROL AND OPTICAL COMMUNICATIONS SYSTEM USING THE SAME

CROSS-REFERENCE TO RELATED APPLICATIONS

The present invention claims the benefit of provisional application 60/777,610 filed Feb. 28, 2006. This patent application is a continuation-in-part of U.S. Ser. No. 10/613,772 filed Jul. 2, 2003 now U.S. Pat. No. 7,272,271, incorporated herein by reference. This application is also a continuation-in-part of U.S. patent application Ser. Nos. 10/669,130 filed on Sep. 22, 2003 now U.S. Pat. No. 7,327,913 and 10/672,372 filed on Sep. 26, 2003 now U.S. Pat. No. 7,186,772, incorporated herein by reference.

FIELD OF INVENTION

This invention relates generally to optical communications especially coherent communication with quaternary phase shift keying (QPSK) modulation format. Quadrature modulators are used in these systems for QPSK data encoding. The present invention relates to methods and systems of control for integrated quadrature modulators.

BACKGROUND OF THE INVENTION

Multi-level phase-shift-keying (PSK) offers high spectral efficiency transmission in coherent optical communication systems. Quaternary PSK (QPSK) format, in particular, has recently received much attention. An optical QPSK signal can be generated, e.g., by an integrated $LiNbO_3$ quadrature modulator (QM) with two parallel Mach-Zehnder modulators (MZMs) nested in a MZ interferometer. Each MZM is driven to produce a binary PSK (BPSK) signal. An optical QPSK signal is produced when the two MZMs are biased at their null transmission points and the MZ interferometer is biased at the quadrature phase ($\pi/2$). FIG. 1 shows a schematic of a quadrature modulator 1 known in the prior art. The principle of its operation is as follows. Input optical beam 2 is splitted into two arms of the MZ interferometer by a splitter 3. Two Mach-Zehnder modulators 4 and 5 are placed in parallel; each MZM being located in each arm of the MZ interferometer. The biases of the MZMs are controlled by control signals 7 and 8 and driven by RF data signals 8 and 9. The Phase port of the QM 10 controls relative phase shift between the arms of the MZ interferometer.

In modern communication systems operating at a speed exceeding 10 Gbits/s, a precise stabilization of QPSK modulators is required. There is a need for an automatic feedback control loop that searches for these biases and phase operating points of the QM at initial startup and maintains them during operation.

SUMMARY OF THE INVENTION

The method and system are disclosed for an automatic feedback control of integrated quadrature modulator for generation of optical quaternary phase-shift-keyed signal in coherent optical communications.

The method comprises the steps of detecting at least a part of output signal from the modulator; extracting of a particular portion of the output signal in RF frequency domain; and minimizing the output signal in RF frequency domain by dithering a voltage applied to a phase shifter of the QPSK modulator. Additionally the method includes detecting the output signal power and minimizing this output signal power by dithering a voltage applied to a first and a second bias of the QPSK modulator.

Alternative method includes detecting the output signal power and maximizing this output signal power by dithering a voltage applied to a first and a second bias of the QPSK modulator.

The control loop algorithm uses a steepest decent algorithm to search for optimal operating points of the quadrature modulator via dithering of its biases and phase. The criteria for the dithering are based on minimization of the RF signal voltage and maximization or minimization of the optical average power of the output signal.

An optical communications system is proposed that incorporates QSPK modulator for data encoding with the feedback loop control of the modulator to improve transmission performance. In the preferred embodiment the communication system includes an integrated coherent receiver based on 90-degrees optical hybrid.

Yet another object of the present invention is an optical communications system operating in two polarization states of light. The system incorporates two QPSK modulators having, its feedback loop control.

DETAILED DESCRIPTION OF THE PREFERRED EMBODIMENT

Figure 2:
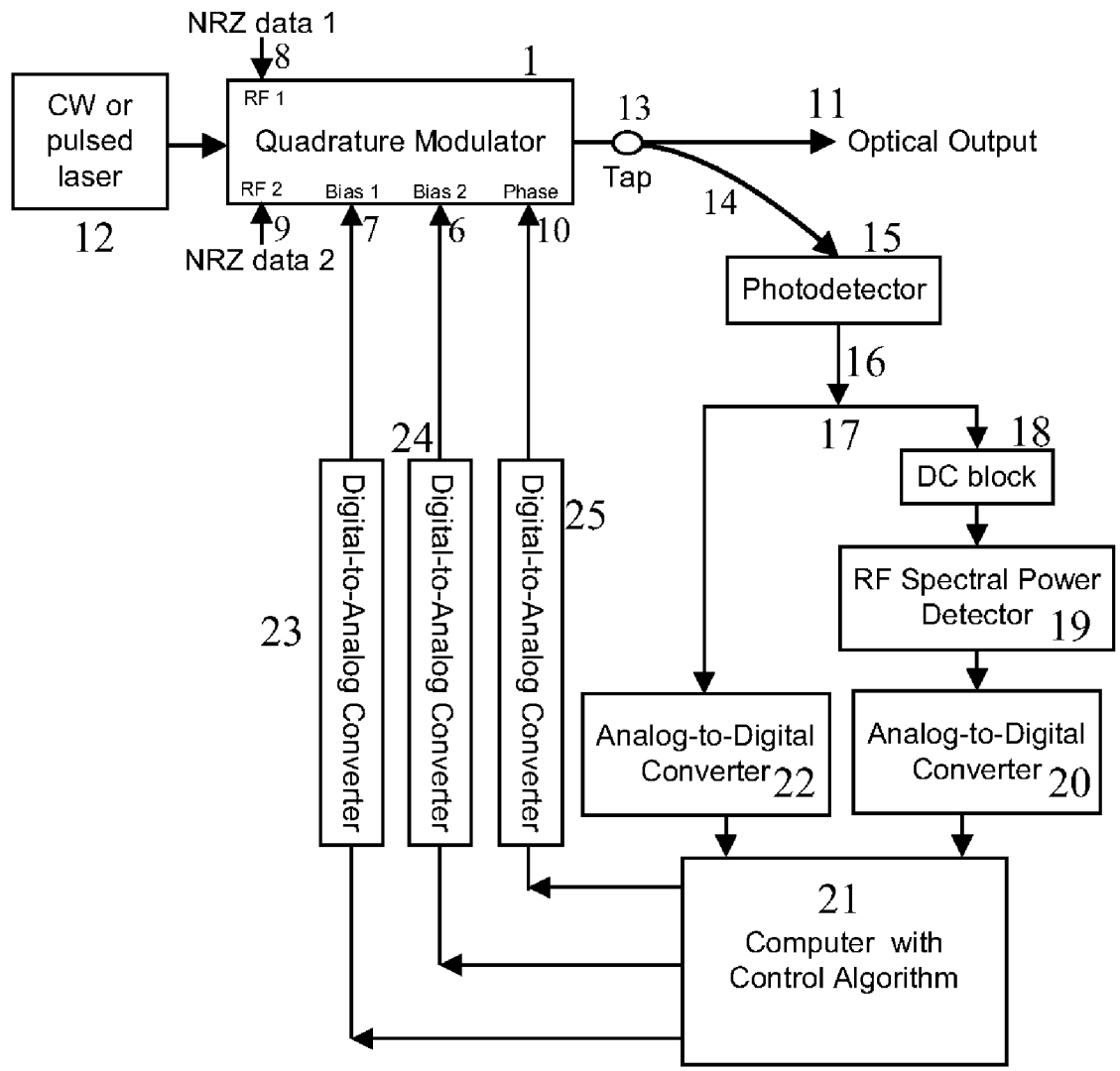
FIG. 2 shows a schematic diagram of control unit for quadrature modulator in optical communications.

A schematic diagram for a feedback control loop for the quadrature modulator is shown in FIG. 2. A light source 12 is launched into a quadrature modulator 1. In the preferred embodiment the light source is a CW or pulsed laser. The quadrature modulator is driven by two high-speed (>10 Gbits/s) non-return-to-zero (NRZ) binary data streams through RF ports 8 and 9. The optical output of the quadrature modulator is divided into two paths using a tap 13. The optical beam 14 from the tapped output is impinged to a low-speed (e.g., 750 MHz) photodetector 15. In the preferred embodiment the photodetectcor 15 is a single photon absorption photodetector. The electrical signal 16 from the photodetector 15 is divided into two by splitter 17 with one path connected to a DC block 18 to reject dc components of the electrical signal. This is followed by a RF spectral power detector (e.g., Schottky diode) 19 to extract the low-frequency RF spectral power ($V_{RF}$). The signal is then digitized using an analog-to-digital converter (ADC) 20 connected to a digital signal processing (DSP) unit 21. The DSP unit contains a code that executes the control loop algorithm. The second path from the photodetector output is directly connected to another ADC 22 that provides monitoring of the optical average power. Outputs of the DSP unit are converted in analog signals by digital-to-analog converters 23, 24, 25 and directed to the two bias ports 6 and 7 and the phase port 10 of the quadrature modulator 1.

Figure 1:
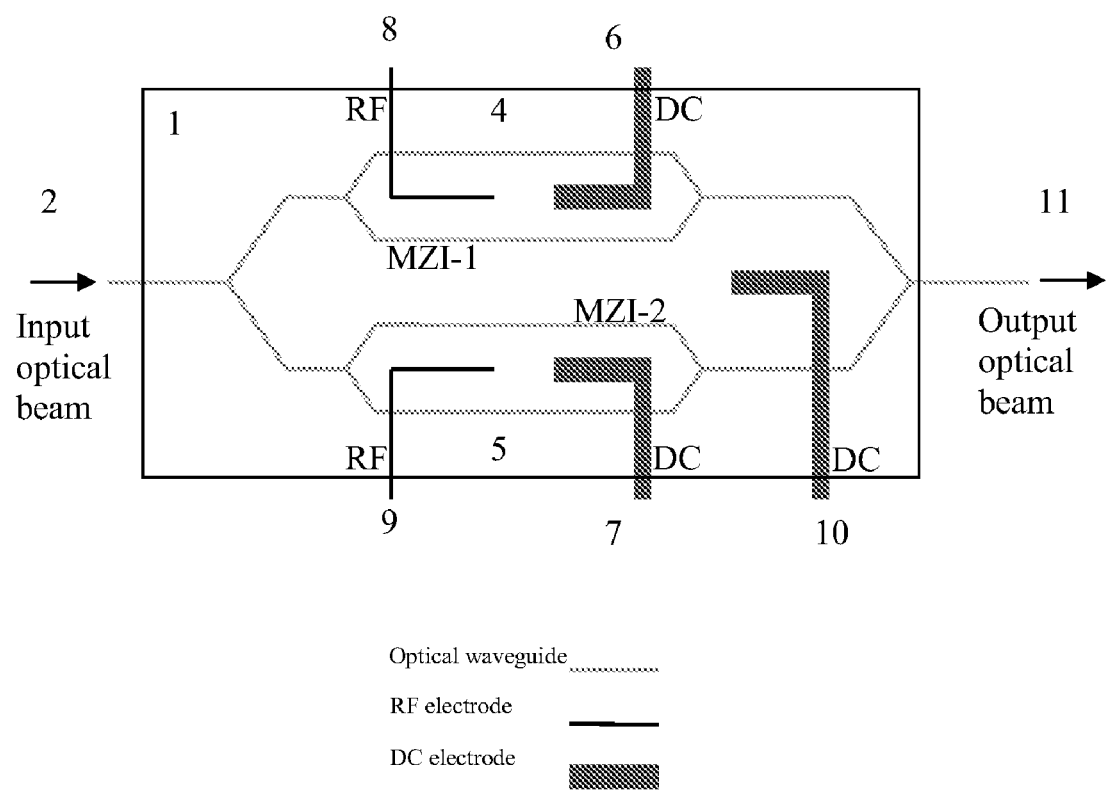
FIG. 1 shows a schematic of a quadrature modulator with two parallel MZMs nested in a MZ interferometer with a phase bias (Prior Art).

The principle of feedback loop operation becomes clear from the following detailed description of its operation. FIG. 1 shows a schematic of a QM with two push-pull type MZMs with RF and DC bias electrodes nested in a MZ interferometer with a phase electrode for quadrature bias. Consider a single MZM, the directly detected optical output power is: $P_o(t) = (kP_i/2)\{1+\cos[\pi(V_s(t)+V_B)/V_\pi]\}$, where $V_s(t)$ is the NRZ drive signal with a peak-to-peak voltage swing $V_{pp}$, $V_B$ is the is voltage, $V_\pi$ is the half-wave voltage $P_i$ is the input optical power, and k accounts for the insertion loss of the MZM. To generate optical BPSK signal, the MZM bias is set to the null transmission with $V_B = \pm V_\pi, \pm 3V_\pi, \ldots$, and $V_s$ varies between $\pm V_\pi$. The output average power over a period of time T is $$\langle P_o(t) \rangle = \frac{kP_i}{2}\left(1 + \frac{1}{T}\int_0^T \cos\left[\frac{\pi}{V_\pi}(V_s(t)+V_B)\right]dt\right).$$

Taking the derivative of the above with respect to $V_B$ and equating to zero gives $$\frac{\partial \langle P_o(t) \rangle}{\partial V_B} =$$

$$-\frac{kP_i}{2}\frac{\pi}{V_\pi}\frac{1}{T}\int_0^T \sin\left[\frac{\pi}{V_\pi}(V_s(t)+V_B)\right]dt = 0 \Rightarrow \sin\left[\frac{\pi}{V_\pi}(V_s(t)+V_B)\right] = 0.$$

The above is satisfied if $V_s=mV_\pi$ and $V_B=nV_\pi$ (m, n=0, ±1, ±2, …). Taking the second derivative of $<P_o(t)>$ with respect to $V_B$ gives $$\frac{\partial^2 \langle P_o(t) \rangle}{\partial V_B^2} = \frac{kP_i}{2}\left(\frac{\pi}{V_\pi}\right)^2 \frac{1}{T}\int_0^T \cos\left[\frac{\pi}{V_\pi}(V_s(t)+V_B)\right]dt.$$

Therefore, the conditions for extrema of the average optical power are $$\langle P_o(t) \rangle_{max} \Rightarrow \frac{\partial^2 \langle P_o(t) \rangle}{\partial V_B^2} < 0 \Rightarrow \cos\left[\frac{\pi}{V_\pi}(V_s(t)+V_B)\right] > 0,$$

$$\langle P_o(t) \rangle_{min} \Rightarrow \frac{\partial^2 \langle P_o(t) \rangle}{\partial V_B^2} > 0 \Rightarrow \cos\left[\frac{\pi}{V_\pi}(V_s(t)+V_B)\right] < 0.$$

For null transmission of the MZM, $V_B = \pm V_\pi, \pm 3V_\pi, \ldots$, so that the above can be written as follows $$\langle P_o(t) \rangle_{max} \Rightarrow \frac{\partial^2 \langle P_o(t) \rangle}{\partial V_B^2} < 0 \Rightarrow \cos\left[\frac{\pi}{V_\pi}V_s(t)\right] < 0 \Rightarrow V_\pi < V_{pp} \leq 2V_\pi,$$

$$\langle P_o(t) \rangle_{min} \Rightarrow \frac{\partial^2 \langle P_o(t) \rangle}{\partial V_B^2} > 0 \Rightarrow \cos\left[\frac{\pi}{V_\pi}V_s(t)\right] > 0 \Rightarrow 0 < V_{pp} < V_\pi.$$

Therefore, in order to maintain null transmission of the MZM for BPSK operation the average power of the MZM output should be maximized for $V_\pi < V_{pp} \leq 2V_\pi$ or minimized for $0 < V_{pp} < V_\pi$.

FIG. 3*a* shows a simulated output optical average power of the QM versus $V_B$ for $V_{pp}$ of 0.75 and $1.2V_\pi$. The simulation uses a 12.5 Gb/s NRZ pseudo-random binary sequence (PRBS) with a word length of $2^{11}-1$ with realistic waveforms (finite rise and fall times and ringings) driving the two MZNs of the QM biased to quadrature phase. The two NRZ signals are complementary with a 2-symbol relative time delay. Gaussian noise was added to the drive signal and to the input optical field to check the robustness of the response. As can be seen the simulation result is consistent with the dependence of the average power on the MZM bias analyzed above.

Consider now the phase bias of the MZ interferometer of the QM where the phase shift between the two BPSK signals (I and Q) is $\Delta\phi_{IQ}$. It can be shown that the directly detected output power of the QM is given by $$P_{QM}=(kP_i/4)\{1-\cos(\pi V_I/V_\pi)/2-\cos(\pi V_Q/V_\pi)/2+2\sin[\pi V_I/(2V_\pi)]\sin[\pi V_Q/(2V_\pi)]\cos(\Delta\phi_{IQ})\},$$

where $V_I$ and $V_Q$ are the NRZ binary data signals applied to the two MZMs biased at their null transmission points ($V_B=V_\pi$). Assuming $V_I$ and $V_Q$ varies between $\pm V_\pi$, the detected output can thus be simplified as follows $$P_{QM} = \begin{cases} kP_i[1+\cos(\Delta\phi_{IQ})]/2, & \text{for } V_I = V_Q = \pm V_\pi, \\ kP_i[1-\cos(\Delta\phi_{IQ})]/2, & \text{for } V_I = \pm V_\pi \text{ and } V_Q = \mp V_\pi. \end{cases}$$

Figure 3:
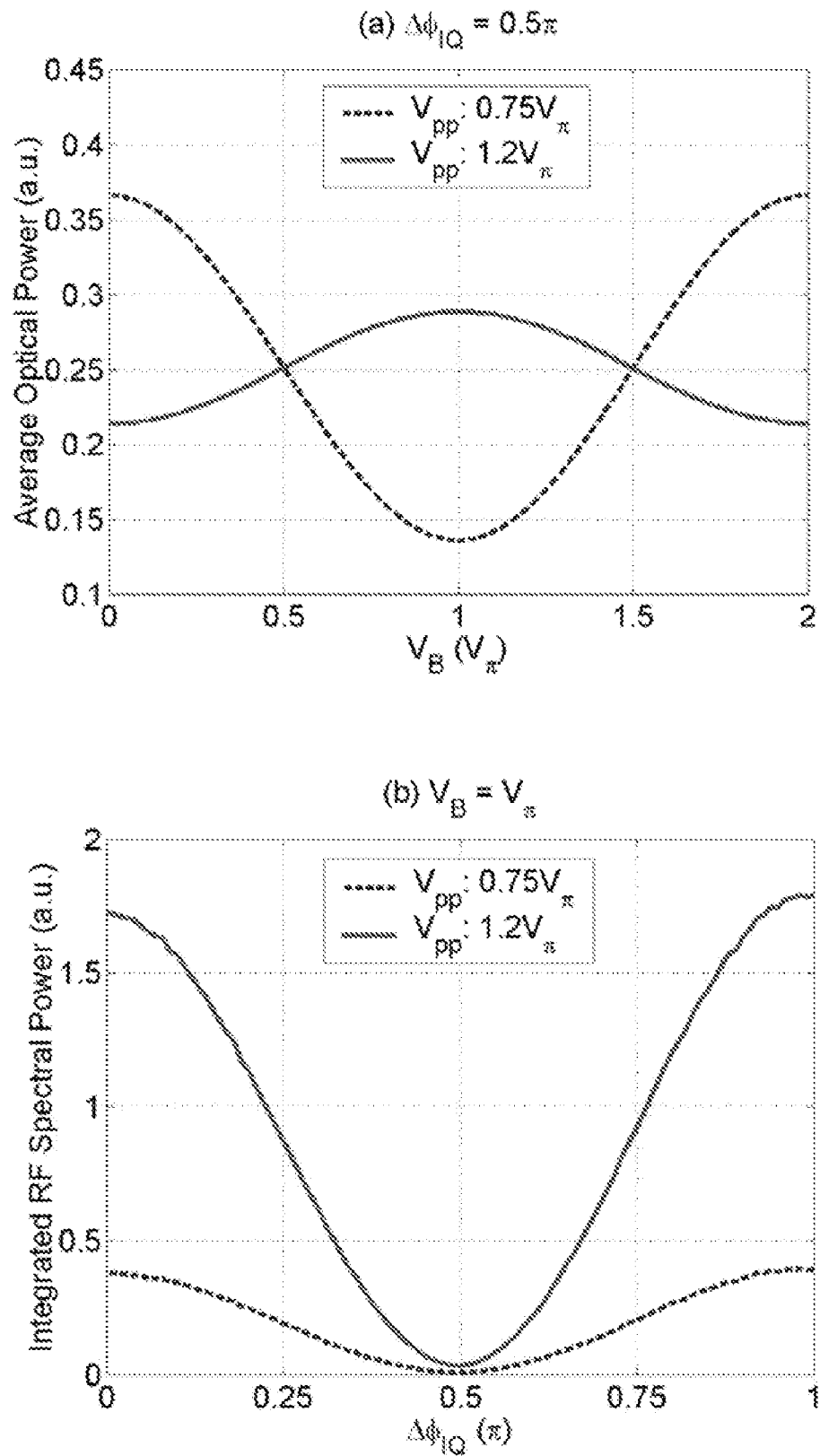
FIG. 3 shows simulation results for (a) average power versus bias voltage of MZM and (b) integrated RF spectral power versus $\Delta\phi_{IQ}$ for NRZ drive signal swing of 0.75 and $1.2V_\pi$.

It is clear that data-like binary pattern will appear at the output of the QM if the MZ interferometer is not in quadrature ($\Delta\phi_{IQ} \neq \pi/2$). The RF spectrum of $P_{QM}$ contains low-frequency components due to this data pattern. Therefore, a minimum integrated RF spectral power of $P_{QM}$ should be an indication that $\Delta\phi_{IQ}$ is close to $\pi/2$. FIG. 3*b* shows the simulated integrated RF spectral power of $P_{QM}$ ($V_{RF}$) for $V_{pp}$ of 0.75 and $1.2V_\pi$ versus $\Delta\phi_{IQ}$ using similar NRZ drive signals with Gaussian noise as in FIG. 3*a*. The results are in agreement with the analysis. Note that the dependence of $V_{RF}$ on $\Delta\phi_{IQ}$ is not affected by $V_{pp}$. Based on the analysis and results shown in FIG. 3, a QM control loop algorithm and model was developed.

The control loop uses a steepest decent algorithm to search for optimal operating points of the QM via dithering of its biases and phase. The dithering is performed continuously while monitoring the two feedback signals: $V_{RF}$ and the average optical power. The criteria for the dithering is based on minimization of the signal $V_{RF}$ and maximizes or minimizes the optical average power if the peak-to-peak NRZ drive signal is above or below the half-wave voltage ($V_\pi$) of the quadrature modulator as described earlier.

Figure 4:
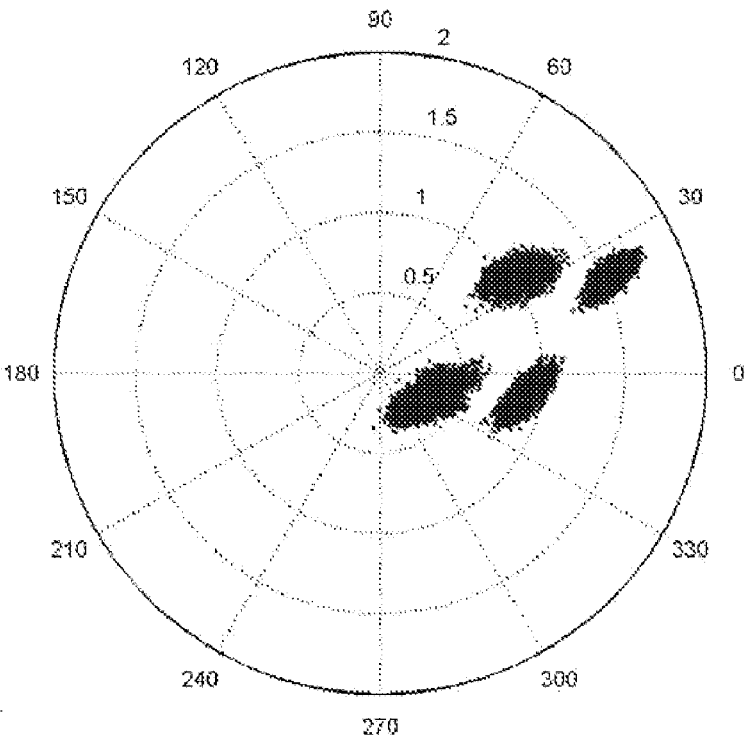
FIG. 4 shows constellation plots of the QM optical output at startup (a) and after 50 iterations of the control loop (b). Plot of deviations of the two biases and phase from their optimal points ($\pi$ and $\pi/2$) versus iteration number are shown in (c).
Figure 4:
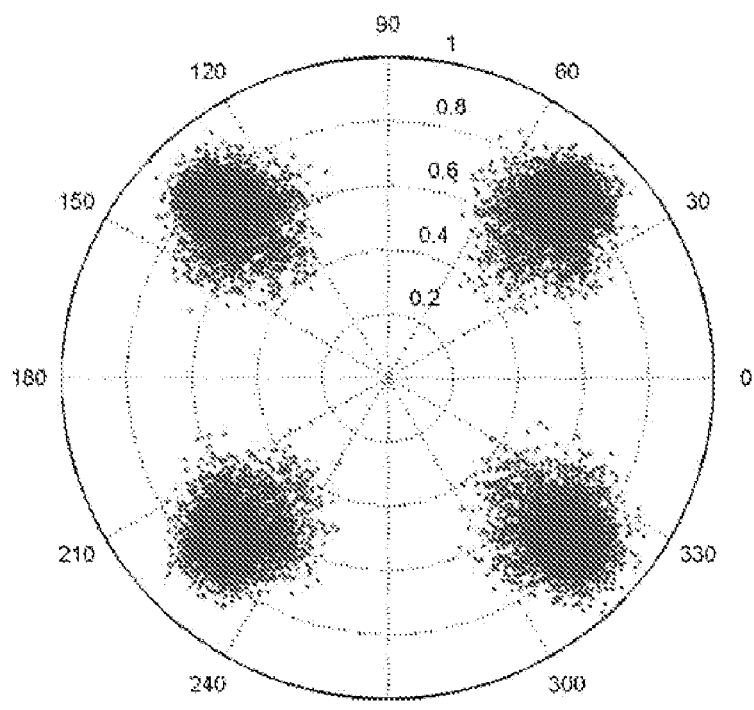
Figure 4C:
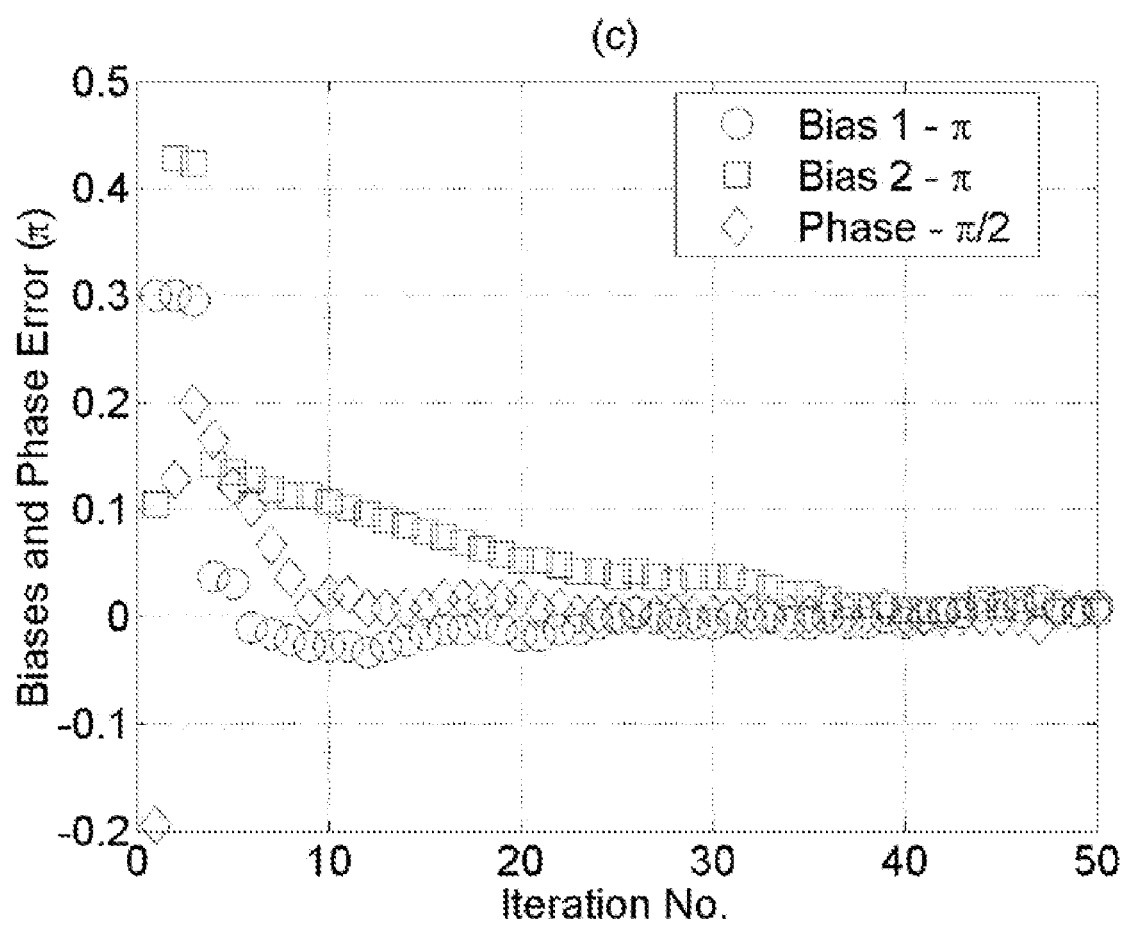

FIG. 4 shows typical simulation results of the control loop with Gaussian noise added to the drive signals and to the input optical field as before. One can see that the control loop is quite robust even in the presence of significant amount of amplitude and phase noise. Convergence to optimal operating points was observed for many random initial biases and phases of the QM tested.

Example 1

QM Control Loop Experiment

An experiment on closed-loop control of the QM was conducted to investigate its performance for generation of a 12.5-GSym/s optical QPSK signal. A packaged LiNbO$_3$ QM was driven by two 12.5 Gb/s NRZ PRBS (word length: $2^{15}-1$) signals. The two NRZ signals are complementary with a 2-symbol relative time delay. The NRZ drive voltage swing applied to the QM was $V_p \sim 1.2 V_\pi$. The output of the QM was tapped off and directed to a 750-MHz photodetector where its output was divided into two with one path connected to a Schottky diode detector to extract the low-frequency RF spectral power ($V_{RF}$). The signal was amplified and directed to a commercial off-the-shelf (COTS) analog-to-digital converter (ADC) connected to a desktop computer (PC) running a code based on the control loop algorithm described earlier. The second path was amplified and directly connected to the ADC that provides monitoring of the optical average power. Outputs of a COTS digital-to-analog converter connected to the PC are directed to the two MZM bias ports and the phase port of the QM. This completes the QM feedback control loop.

Figure 5:
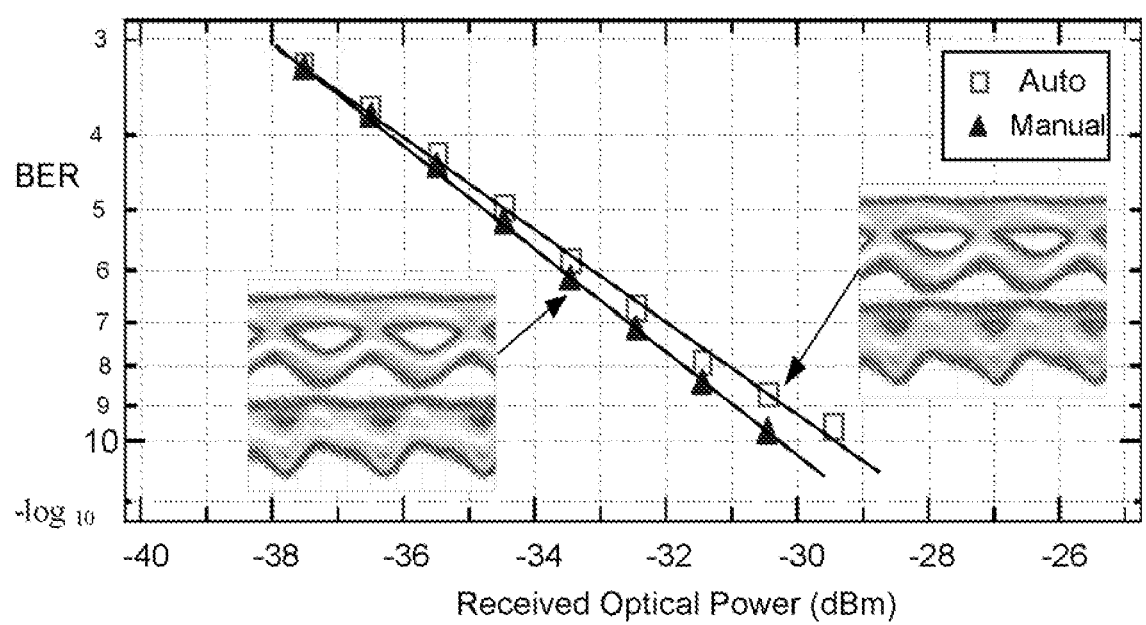
FIG. 5 shows BER versus received optical power of the differentially detected QPSK signal with automatic control loop or with manual adjustment of the QM. Inset shows eye diagram (top) of the differentially detected 12.5 GSym/s QPSK signal and the directly detected output from the QM (bottom). Horizontal scale: 20 ps/div.

The 12.5 GSym/s optical QPSK signal was directed to a receiver with an optical pre-amp and a band-pass filter. Differential detection of the 12.5 GSym/s QPSK signal was employed using a fiber-based asymmetric Mach-Zehnder (AMZ) interferometer with a one-symbol differential delay (80 ps). The two outputs of the AMZ demodulator were directed to a 15-GHz balanced photoreceiver. The differential phase shift of the AMZ was adjusted to approximately $\pm\pi/4$ to obtain maximum eye opening. FIG. 5 shows BER measurements of the differentially detected QPSK signal using the automatic control loop. Measurements using manual adjustment of the DC biases and phase of the QM by minimizing the BER are also shown. A power penalty of about 1 dB at $10^{-9}$ BER was observed for the control loop. This is attributed to the dithering and the relatively flat responses of $V_{RF}$ and the average power near their optimal points as can be seen in FIG. 2. Nevertheless, the control loop concept was demonstrated and validated using COTS components. The QM control loop was operated continuously for about 20 hours with no degradation in performance. The control loop is expected to work for higher symbol rates since no high-speed components are required in the loop. The control loop also works for RZ format of the QPSK signal. Generation and detection of 12.5 GSym/s RZ-DQPSK has using the QM control loop was conducted and its performance was verified.

Coherent communications system with quadrature modulator having a control unit is another object of the present invention.

Figure 6:
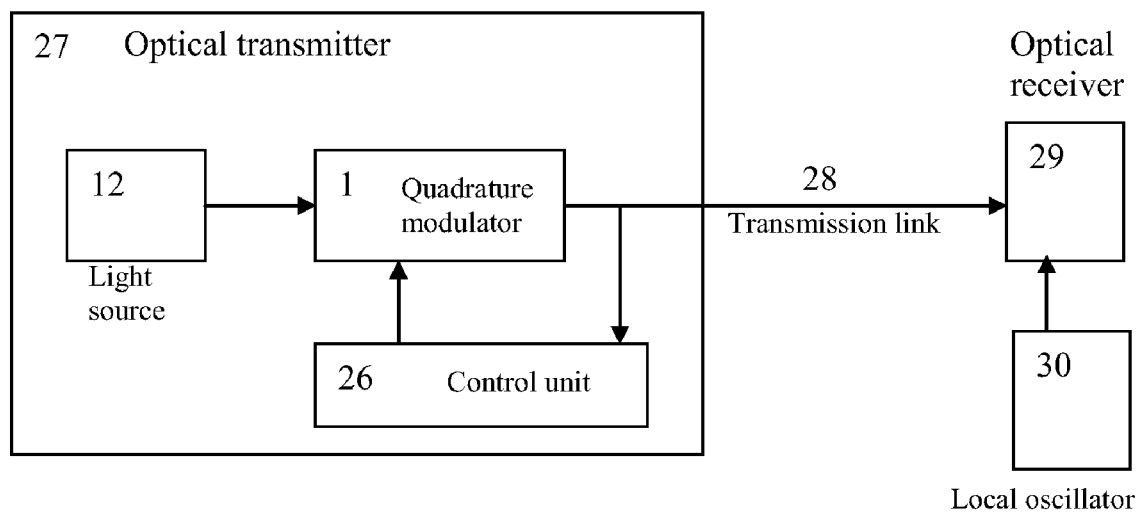
FIG. 6 shows block diagram of an optical communications system that includes quadrature modulator having a control unit according to FIG. 2.

The block diagram of a coherent communications system according to the present invention is shown in FIG. 6. Optical transmitter comprises a light source 12 and a quadrature modulator 1 with a control unit 26 that allows optimizing the data transmission performance. Encoded optical signal is transmitted over the transmission link 28 to the coherent optical receiver 29 where the data is decoded by mixing the transmitted optical signal with a signal from a local oscillator 30.

In the preferred embodiment the coherent optical receiver is an integrated receiver based on 90-degrees optical hybrid as disclosed in co-pending U.S. patent application Ser. Nos. 10/669,130 filed on Sep. 22, 2003 and 10/672,372 filed on Feb. 7, 2007 by the same inventors, incorporated herein by references.

Figure 7:
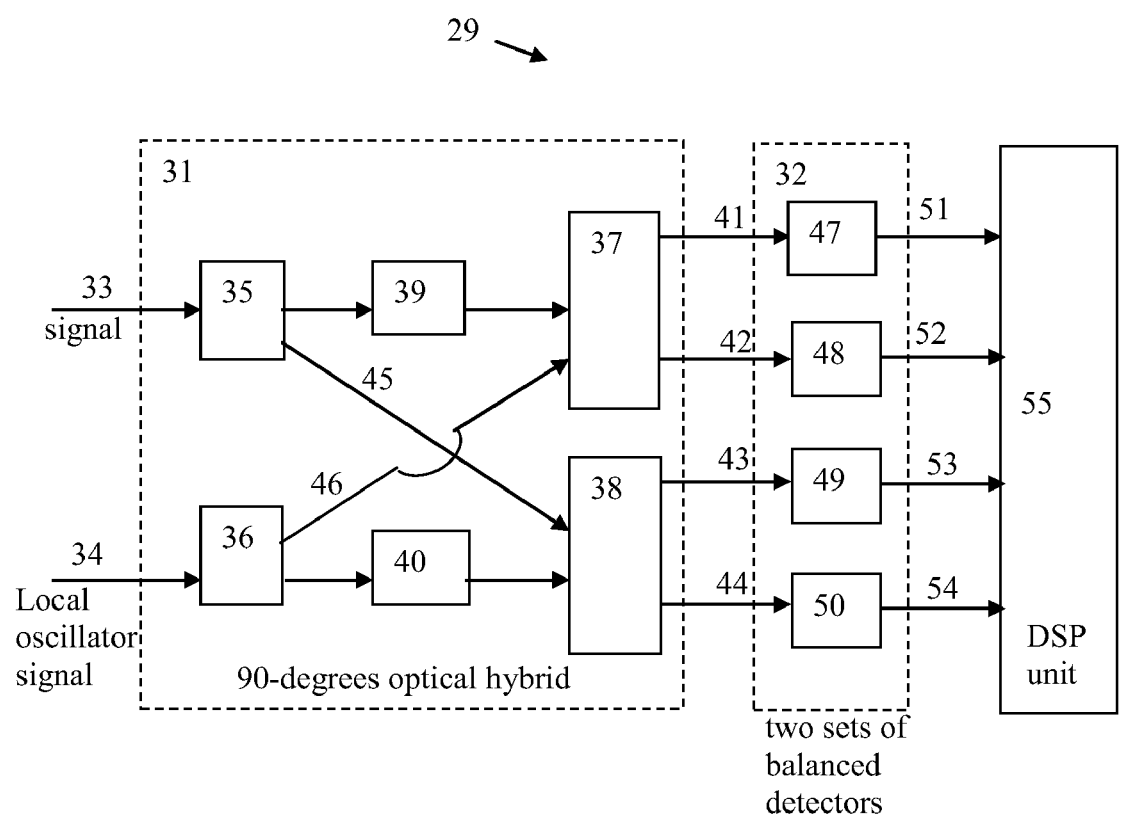
FIG. 7 shows a block diagram of a coherent optical receiver for the optical communications system of FIG. 6.

FIG. 7 illustrates a coherent receiver 29 of the preferred embodiment. It includes an optical interface 31 and a receiving unit 32. The interface includes a first device input 33 and a second device input 34; first 35, second 36, third 37 and fourth 38 couplers (mixers); a first phase shifter 39 and a second phase shifter 40, and first 41, second 42, third 43, and fourth 44 outputs. The optical interface further includes two crossing waveguides 45 and 46, which ross each other. The receiving unit 32 includes four photodetectors 47, 48, 49 and 50 having outputs 51, 52, 53, and 54 respectively. The receiver further includes data digital processing unit 55.

The first 33 and the second 34 device inputs both are connected, respectively to the first coupler 35 and the second coupler 36. One output of the first coupler 35 is connected to one input of the third coupler 37 while another output of the first coupler 35 is connected to the one input of the fourth coupler 38 by a first crossing waveguide 45. An output of the second coupler 36 is connected to another input of the fourth coupler 38 while another output of the second coupler 36 is connected to another input of the third coupler 37 by a second crossing waveguide 46. The optical interface also includes at least one phase shifter positioned between two locations. The first location is one of the outputs of the first or second coupler. The other location is one of the inputs of the third or fourth couplers, which corresponds (connected by a crossing waveguide) to the first location. The first and second outputs of the third coupler 37 produce the first 41 and the second 42 device outputs, respectively. The first and second outputs of the fourth coupler 38 produce the third 43 and the fourth 44 device outputs, respectively.

Signals coming out of the outputs 41, 42, 43, and 44 impinge photodetectors 47, 48, 49, and 50, respectively. It is preferred that the photodetectors are PIN photodiodes. The photodiodes are located at equal distance apart. The distance between the neighbor photodiodes can be from 0.01 to 1 mm. In the preferred embodiment the distance is from 0.1 to 0.2 mm. The array of the photodiodes is fabricated on top of a single substrate. InGaAs photodiodes produced by OSI Optoelectronics, Inc, (Hawthorne, Calif.) are examples of such photodiodes. In the preferred embodiment the substrate is made of alumina.

Figure 8:
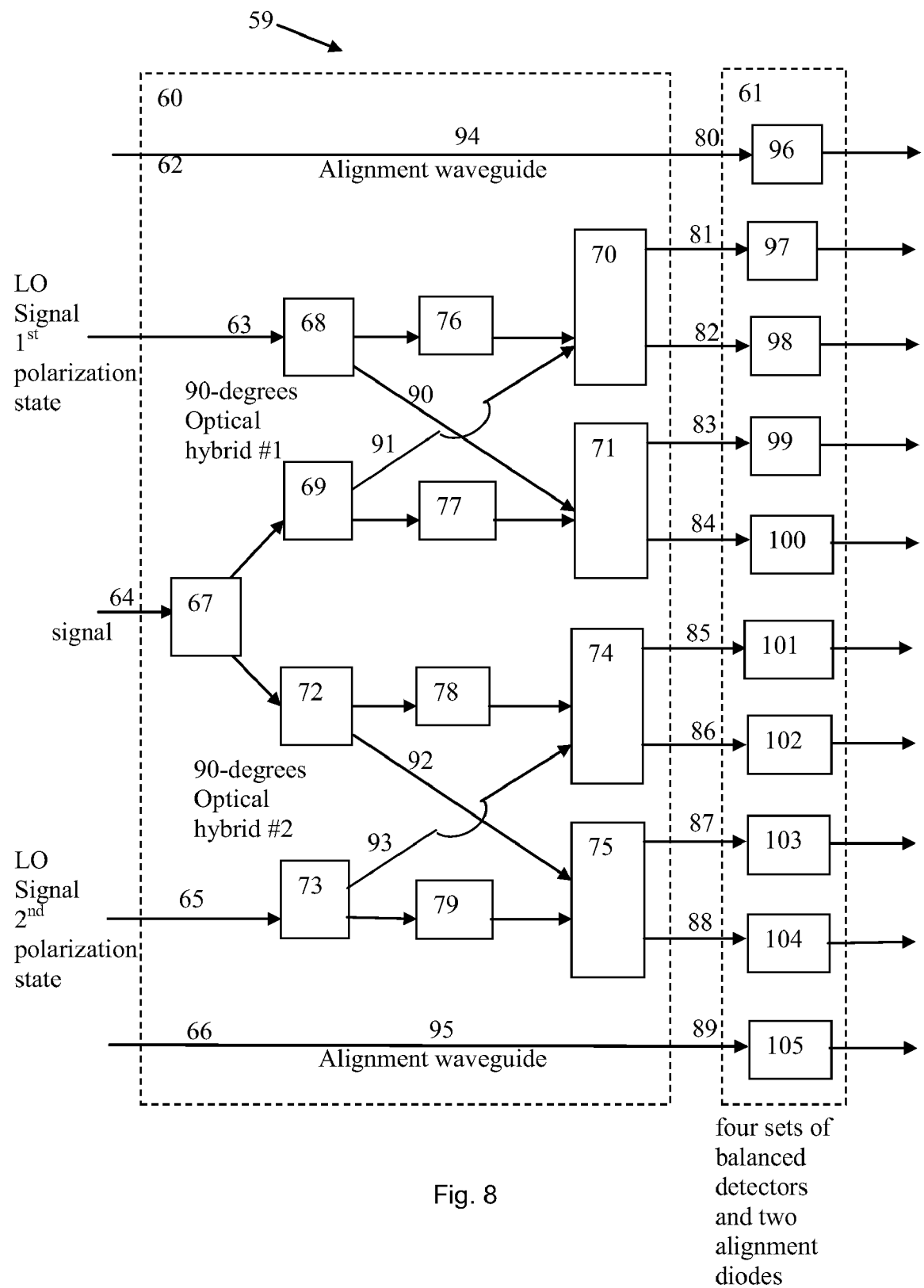
FIG. 8 shows a block diagram of a coherent optical receiver operating in two polarization states of light.

In another embodiment an optical signal in two polarization states is transmitted over the communications link and by a two polarization coherent detector. One embodiment of a coherent optical receiver 59 operating in two polarizations is shown in FIG. 8. It includes an optical interface 60 and a set of photodiodes 61. The interface includes a first device input 62, a second device input 63, a third device input 64, a fourth device input 65, a fifth device input 66; a polarization beam splitter 67, first 68, second 69, third 70, fourth 71, fifth 72, sixth 73, seventh 74, and eighth 75 couplers (mixers); a first phase shifter 76, a second phase shifter 77, a third phase shifter 78 and a fourth phase shifter 79, first 80, second 81, third 82, fourth 83, fifth 84, sixth 85, seventh 86, eighth 87, ninth 88, and tenth 89 device outputs. The device further includes two sets of crossing waveguides (90 and 91) and (92 and 93). The receiver may optionally include two alignment waveguides 94 and 95 are located on opposite sides of the optical interface 60.

Signals coming out of the ten outputs 80, 81, 82, 83, 84, 85, 86, 87, 88, 89 impinge photodetectors 96, 97, 98, 99, 100,

101, 102, 103, 104, 105, respectively. It is preferred that the photodetectors are PIN photodiodes. Similarly to the device in FIG. 7, the photodiodes are located at equal distance apart. The distance between the neighbor photodiodes can be from 0.01 to 1 mm. In the preferred embodiment the distance is from 0.1 to 0.2 mm. During the fabrication on the optical interface 60 alignment relatively the photodetector unit 61 is performed by light passing through waveguides 94 and 95 and positioning the unit 61 to maximize the current from photodiodes 96 and 105. The accuracy of alignment is at least 1 micron. In the preferred embodiment the accuracy is about 0.1 micron.

Figure 9:
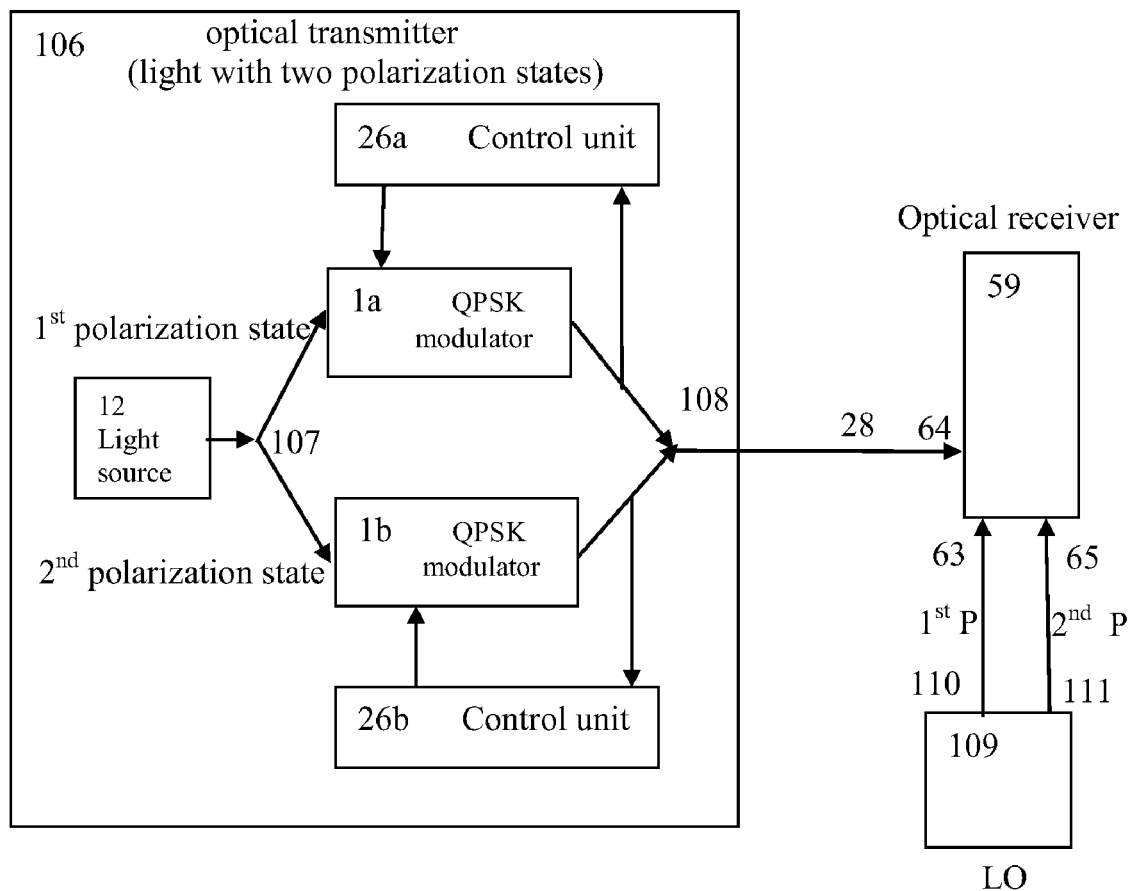
FIG. 9 shows block diagram of an optical communication system operating in two polarization states of light.

An optical communication link shown in FIG. 9 illustrates light transmission in two polarizations according to the present invention. Two-polarization transmitter 106 includes the light source 12 and two QPSK modulators 1a and 1b, each being controlled by its control unit 26a and 26b respectively. Output beam from the light source 12 is split into two beams by polarization beam splitter 107. Each of modulators 1a and 1b operates with the light of one polarization state. Output beam from the modulators 1a and 1b being combined by a polarization beam combiner 108 is transmitted over the communications link 28 towards the coherent optical receiver 59 operating in two light polarization states. The transmitted signal impinges the input 64 of the receiver 59. In the receiver 59 the transmitted signal is mixed with two signals from a local oscillator 109 operating in two light polarization states. Local oscillator beams 110 and 110 have orthogonal polarization states and impinge the receiver 59 via the inputs 63 and 65 shown in FIG. 8.

The elements in the optical receivers 31 and 60 can each be formed as part of a single planar chip made of an electro-optical material. In various embodiments, the chip is a monolithic piece of a wafer that can be made of semiconductor or ferroelectric materials including but not limited to $LiNbO_3$, and the like. In various embodiments, different effects relative to the output of the chip of the present invention are possible, including but not limited to, (i) thermo-optical, (ii) electro-optical, (iii) electro-absorption, and the like. The electro-optical material, which can be $LiNbO_3$, can be cut at X, Y, or Z planes. The device of the present invention can utilize a variety of different processes in its creation, including but not limited to, metal in-diffusion and/or (annealed) protonic-exchange technology, wet etching, reactive ion (beam) etching, plasma etching, and the like.

Integration of components in a single chip, such as $LiNbO_3$ and the like, can, among other things, reduce cost, improve performance, and provide better stability and control. The optical interfaces 31 and 60 of the present invention, when integrated on a single chip and/or in single package, can be used for various applications, including those that require simultaneous measurement of phase and amplitude of the optical field. In the preferred embodiment the receiving units 32 and 61 include the balanced receivers and optionally Trans-Impedance Amplifiers (TIAs), all formed as a part of a single integrated package.

Alternatively the integrated device chip can be made of the semiconductor material selected from Si and InP.

The description of the invention has been presented for purposes of illustration and description. It is not intended to be exhaustive or to limit the invention to the precise forms disclosed. Obviously, many modifications and variations will be apparent to practitioners skilled in this art. The application of the disclosed quadrature modulator is not limited to optical communications either free-space, fiber or waveguide. The present invention is related to any other possible applications of QPSK modulation technique.

What is claimed is:

1. An optical communications system adapted to operating in two polarization states of light for transmitting phase shift keying modulated data, comprising:
   a light source;
   a first modulator for modulation of an optical signal, the modulator having a first automatic feedback control, the modulator receiving an optical signal from the light source and producing a first QPSK optical signal;
   a first coherent optical receiver, the first coherent optical receiver mixing the first QPSK optical signal with a first reference signal from a local oscillator, the coherent received demodulating data encoded in the first QPSK optical signal; wherein the first automatic feedback control including a first low speed optical detector to detect at least a portion of the first QPSK optical signal; a first spectral power detector to detect a power of a first RF spectral component of the first QPSK optical signal; and a first digital signal processing (DSP) unit receiving the signal from the first spectral power detector, the first DSP unit controlling a first phase shifter of the first modulator to minimize the signal from the first spectral power detector,
   a second modulator for modulation of an optical signal with a second automatic feedback control, the modulator receiving an optical signal from the light source having a second polarization state being orthogonal to the first polarization state and producing a second QPSK optical signal; a polarization combiner to combine the first and the second QPSK optical signals for transmitting over a communication link, a second coherent optical receiver, the coherent optical receiver mixing the second QPSK optical signal with a second signal from a local oscillator having the same polarization state as the second QPSK optical signal; wherein the second feedback control including a second low speed optical detector to detect at least a portion of the second QPSK optical signal; a second spectral power detector to detect a power of a second RF spectral component of the second QPSK optical signal; a second digital signal processing (DSP) unit receiving the signal from the second spectral power detector, the DSP unit controlling a second phase shifter of the second modulator to minimize the signal from the second spectral power detector.

2. The optical communication system of claim 1, wherein the first DSP unit controlling a first and a second bias of the first modulator to minimize the signal from the first low speed optical detector and the second DSP unit controlling a first and a second bias of the second modulator to minimize the signal from the second low speed optical detector.

3. The optical communication system of claim 1, wherein the first modulator, the second modulator, and the polarization combiner are formed on a single chip.

4. The optical communication system of claim 1, wherein the second coherent optical receiver including a second 90-degrees optical hybrid, and at least two photodiodes, wherein the photodiodes are spaced at a distance from 0.01 to 1 mm.

5. The optical communication system of claim 4, wherein the second coherent optical receiver further comprising: an alignment system for precise alignment of the second 90-degrees optical hybrid relative to the photodiodes during fabrication, the alignment system comprising at least an alignment waveguide and an alignment photodiode.

6. The optical communication system of claim 1, wherein the first modulator comprises a first and a second Mach Zehnder modulators nested in a first Mach Zehnder interferometer.

7. The optical communication system of claim 6, wherein the second modulator comprises a third and a fourth Mach Zehnder modulators nested in a second Mach Zehnder interferometer.

8. The optical communication system of claim 2, the first digital signal processing (DSP) unit uses a steepest decent algorithm to search for optical operating points of the first modulator via dithering of its biases and phase.

9. The optical communication system of claim 8, wherein dithering the first voltage applied to the first bias of the first modulator and dithering the second voltage applied to the second bias of the first modulator are performed continuously during the first modulator operation.

10. The optical communication system of claim 8, wherein changing of the voltage applied to the phase shifter between I and Q components of the first QPSK modulator is performed continuously during the QPSK modulator operation.

* * * * *